(12) United States Patent
Castro et al.

(10) Patent No.: US 11,716,018 B2
(45) Date of Patent: Aug. 1, 2023

(54) LOW WEIGHT ISOLATED INTEGRATED SINGLE-STAGE AC-DC LED DRIVER

(71) Applicant: Goodrich Corporation, Charlotte, NC (US)

(72) Inventors: Ignacio Castro, Gijon (ES); Douglas Araujo Pedroso, Sao Borja (BR)

(73) Assignee: GOODRICH CORPORATION, Charlotte, NC (US)

( * ) Notice: Subject to any disclaimer, the term of this patent is extended or adjusted under 35 U.S.C. 154(b) by 0 days.

(21) Appl. No.: 17/377,430

(22) Filed: Jul. 16, 2021

(65) Prior Publication Data

US 2022/0021295 A1    Jan. 20, 2022

(30) Foreign Application Priority Data

Jul. 17, 2020  (EP) .................................... 20186480

(51) Int. Cl.

| | |
|---|---|
| H02M 1/42 | (2007.01) |
| H02M 1/00 | (2006.01) |
| H05B 45/355 | (2020.01) |
| H05B 45/38 | (2020.01) |
| H02M 3/335 | (2006.01) |
| B64D 41/00 | (2006.01) |
| H02M 1/08 | (2006.01) |

(52) U.S. Cl.
CPC ........ *H02M 1/4258* (2013.01); *H05B 45/355* (2020.01); *B64D 41/00* (2013.01); *B64D 2221/00* (2013.01); *H02M 1/0058* (2021.05); *H02M 1/08* (2013.01); *H02M 1/4225* (2013.01); *H02M 1/4241* (2013.01); *H02M 3/33571* (2021.05); *H05B 45/38* (2020.01)

(58) Field of Classification Search
CPC ............. H02M 1/0058; H02M 1/4241; H02M 1/4258; H05B 45/355; H05B 45/38; B64D 41/00
See application file for complete search history.

(56) References Cited

U.S. PATENT DOCUMENTS 6,282,103 B1 * 8/2001 Naito .................. H02M 1/4266
363/47
6,961,252 B2   11/2005 Takada
(Continued)

FOREIGN PATENT DOCUMENTS

WO    2016037287 A1    3/2016

OTHER PUBLICATIONS

Arias Manuel et al: "Optimized Design of a High Input-Voltage-Ripple-Rejection Converter for LED Lighting", IEEE Transactions on Power Electronics, Institute of Electrical and Electronics Engineers, USA, vol. 33, No. 6, Jun. 1, 2018, pp. 5192-5205.
(Continued)

*Primary Examiner* — Jue Zhang
(74) *Attorney, Agent, or Firm* — Cantor Colburn LLP (57) ABSTRACT

An integrated single stage ac-dc driver for powering LED loads includes a boost converter operating in a Discontinuous Conduction Mode, DCM, comprising a half-bridge, and a Zeta Asymmetrical Half Bridge, ZAHB, integrated with the boost converter such that the boost converter and the ZAHB share the half-bridge to perform power factor control, PFC, with a fixed duty cycle and control an output voltage.

14 Claims, 11 Drawing Sheets

(56) References Cited

U.S. PATENT DOCUMENTS

| 10,498,226 | B2 | 12/2019 | Li et al. |
| 2014/0361701 | A1* | 12/2014 | Siessegger ............ H01L 27/156 |
| | | | 315/307 |
| 2019/0326824 | A1 | 10/2019 | Li et al. |
| 2020/0099311 | A1 | 3/2020 | Askarianabyaneh et al. |

OTHER PUBLICATIONS

Choi W-Y et al: "High-performance front-end rectifier system for telecommunication power supplies", IEE Proceedings: Electric Power Applications, Institution of Electrical Engineers, GB, vol. 153, No. 4, Jul. 1, 2006, pp. 473-482.

Extended European Search Report for International Application No. 20186480.8 dated Jan. 11, 2021, 10 pages.

Jorquera H et al: "A single-stage isolated unity power factor correction scheme with single output voltage control loop, automatic current shaping and fast output voltage regulation", Proceedings of 7th European Conference on Power Electronics and Applications—Sep. 8-10, 1997—Trondheim, Norway; [EPE. European Conference on Power Electronics and Applications], Brussels : EPE Association, 1997, BE, vol. Conf. 7, Sep. 8, 1997, pp. 2923-2928.

Singh Bhim et al: "An EV battery charger with power factor corrected bridgeless zeta converter topology", 2016 7th India International Conference on Power Electronics, Nov. 17, 2016, pp. 1-6.

* cited by examiner

LOW WEIGHT ISOLATED INTEGRATED SINGLE-STAGE AC-DC LED DRIVER

CROSS-REFERENCE TO RELATED APPLICATIONS

This application claims priority to European Patent Application No. 20186480.8 filed Jul. 17, 2020, the entire contents of which is incorporated herein by reference.

FIELD OF THE INVENTION

The present invention relates to AC-DC LED driver.

BACKGROUND OF THE INVENTION

There is a growing interest in power converters that can help on the challenge of aircraft electrification. The main concerns of reducing weight, increasing efficiency or even adding new capabilities are not exclusive to that of primary propulsion. In fact, due to the passenger demands for better comfort in aircraft, such topologies can be additionally put on low power converters used to feed all of loads.

As mentioned above, electrical distribution in most aircrafts is traditionally performed in ac at 115 Vrms. However, most of the loads are fed on dc. Therefore, an ac-dc converter is required, as in the case of supplying LED loads. In the case of LED loads there are several approaches that can be taken to be able to increase power density and increase the lifetime of the power supply, such as integrating a Power Factor Corrector (PFC) with a dc-dc converter.

There are several applications in which it is desirable to increase power density and the lifetime of the power supply used in conjunction with, for example, both exterior and interior lights.

SUMMARY OF THE INVENTION

In a first aspect, there is provided an integrated single stage ac-dc driver for powering LED loads comprising a boost converter operating in a Discontinuous Conduction Mode, DCM, comprising a half-bridge, and a Zeta Asymmetrical Half Bridge, ZAHB. The ZAHB is integrated with the boost converter such that the boost converter and the ZAHB share the half-bridge to perform power factor control, PFC, with a fixed duty cycle and control an output voltage.

Optionally, the integrated single stage ac-dc driver may further comprise a feedforward feedback loop configured to provide proportional integral feedback control to remove ripple and eliminate flicker at the output voltage.

Preferably, the integrated single stage ac-dc driver may further comprise a resonant inductor, $L_{lkg}$, configured to completely discharge a first and a second primary switch of the half-bridge to enable zero voltage switching of the primary switches.

The ZAHB is optionally a tapped inductor or a single winding ZAHB.

In a second aspect, there is provided electrical distribution system comprising an ac power generator; at least one dc load; and the integrated single stage ac-dc driver as described above; wherein the integrated single stage ac-dc driver is configured to convert ac power from the ac power generator to dc power to power the at least one dc load with the output voltage.

Preferably, the at least one dc load may comprise at least one LED load.

The electrical distribution system is an electrical distribution system for an aircraft or for households.

In a third aspect, there is provided a method of converting power using the any of the integrated single stage ac-dc drivers as described above.

In a fourth aspect, there is provided a method, the method comprising operating a boost converter in a Discontinuous Conduction Mode, DCM, the boost converter comprising a half-bridge; and the method further comprises integrating a Zeta Asymmetrical Half Bridge, ZAHB, with the boost converter such that the boost converter and the ZAHB share the half-bridge to perform power factor control, PFC, with a fixed duty cycle and control of an output voltage.

The method may further comprise providing a feedforward feedback loop to provide proportional integral feedback control to remove ripple and eliminate flicker at the output voltage.

Additionally or alternatively, the method may further comprise providing a resonant inductor, $L_{lkg}$, configured to completely discharge a first, $S_1$, and a second, $S_2$, primary switch of the half-bridge to enable zero voltage switching of the primary switches.

The method may further comprise converting ac power from an ac power generator to dc power; and providing the converted dc power to at least one dc load. The at least one dc load may comprise at least one LED load. Further, the at least one DC load may be a load within an aircraft.

BRIEF DESCRIPTION OF THE DRAWINGS

Preferred examples will now be described by way of example only and with reference to the drawings.

DETAILED DESCRIPTION OF THE INVENTION

Whilst the examples explored in detail herein relates to an aircraft based LED driver, such a topology can equally find use in other industrial or household applications in which a single-stage LED driver could be used. For example, particularly for the US or Japanese market where the input ac voltages are similar to the ones used in aircraft applications.

Figure 1:
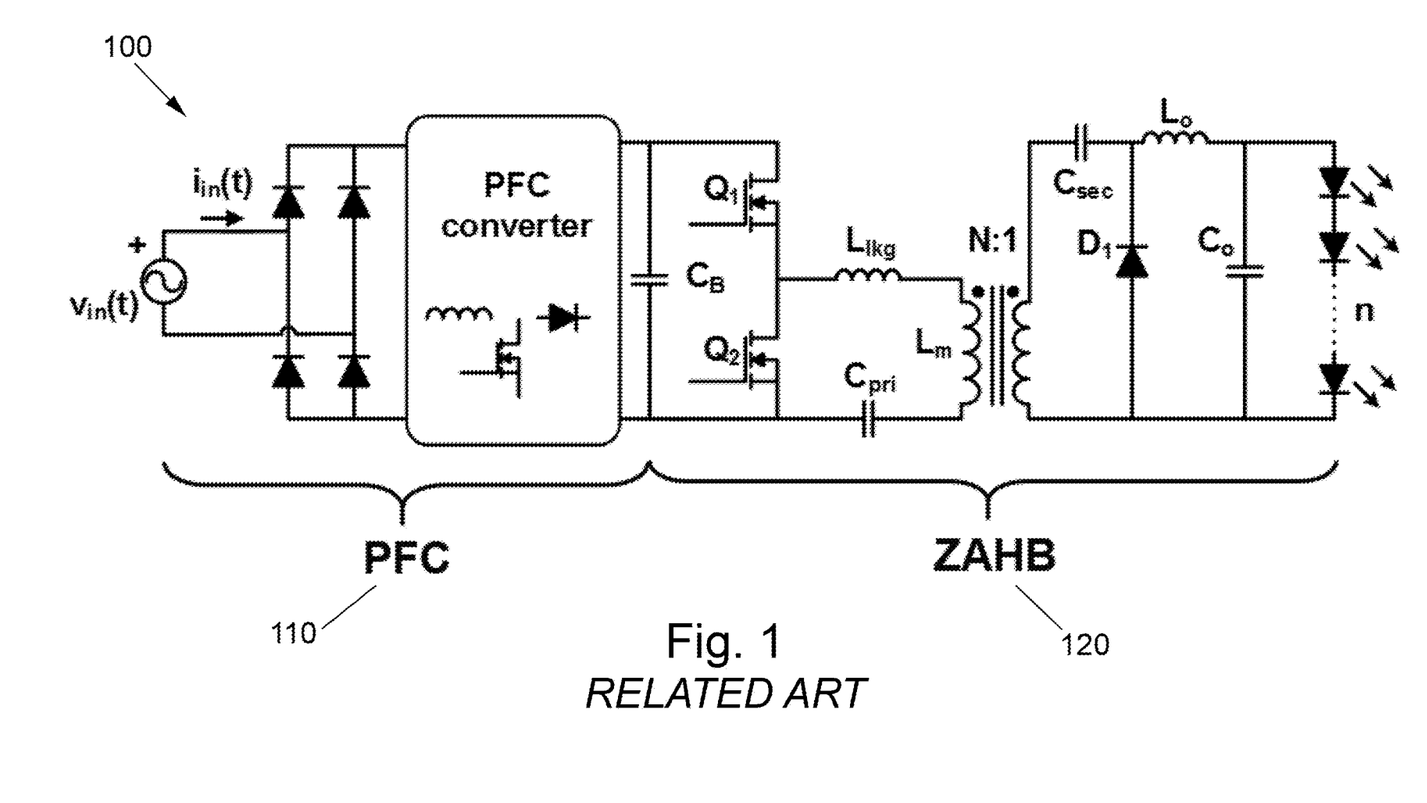
FIG. 1 shows a known two-stage converter topology.

As is shown in the two-stage topology 100 of FIG. 1, typically electrical distribution in most aircraft is performed in at least two stages. The first stage 110 is a power factor converter (PFC) that will be controlled either in Boundary Conduction Mode (BCM) or with an average current multiplier based control.

The second stage 120 is an optimized Zeta Asymmetrical Half-Bridge (ZAHB), which is able to remove the electrolytic capacitor and that overcomes duty cycle limitation imposed by the Asymmetrical Half-Bridge (AHB).

Figure 2:
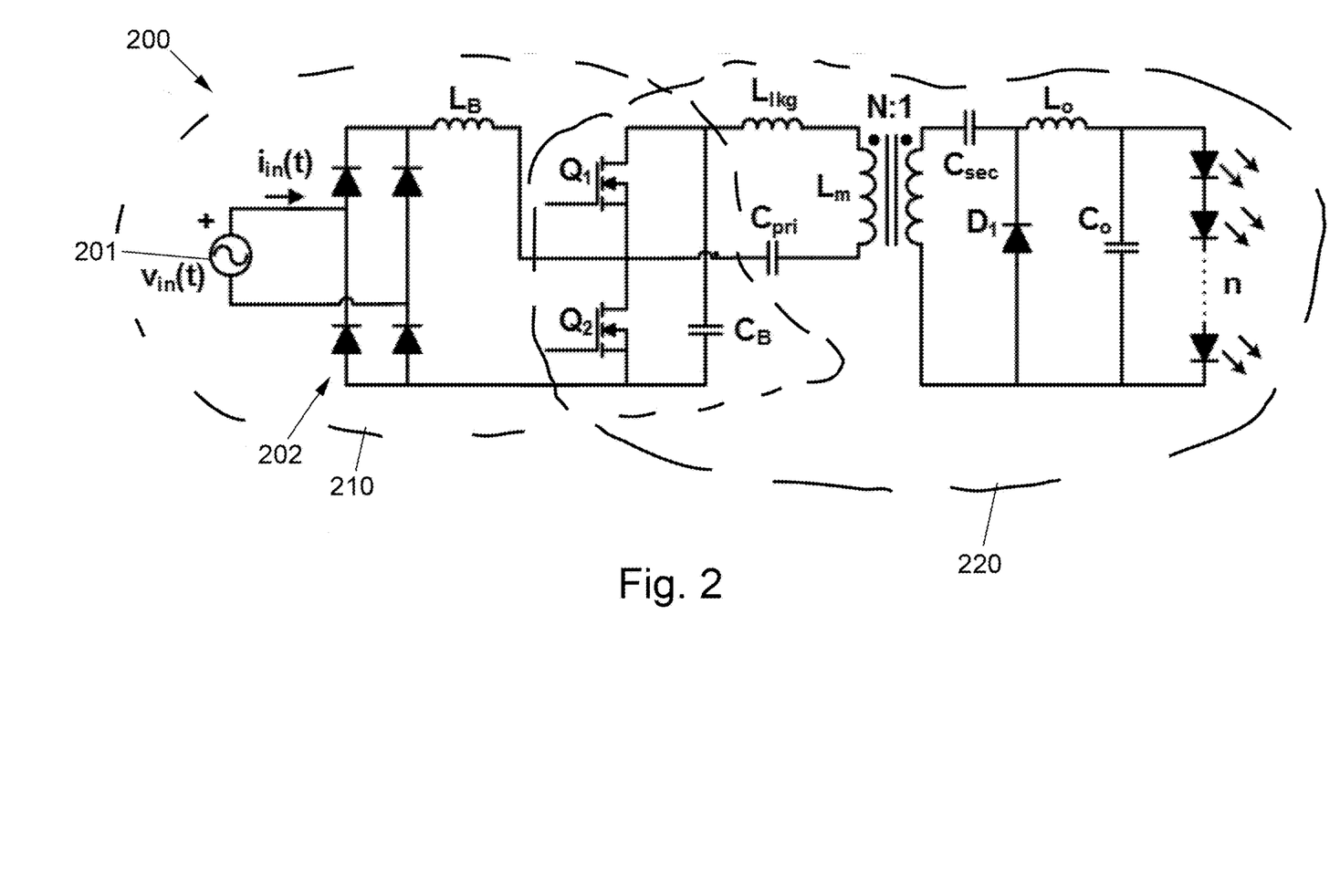
FIG. 2 shows an example circuit diagram of an integrated single-stage converter.

However, by integrating both stages, is possible to leverage the switches of both stages and join the switching behaviour of both stages. Such an integration results in an integrated Zeta Asymmetrical Half-Bridge (IZAHB) 200, as seen in FIG. 2. The integrated stage PFC can only be controlled at a constant duty cycle and at a fixed frequency, limiting the PFC to a Discontinuous Conduction Mode (DCM). Achieving a high PF in DCM requires the bus voltage to be increased, and the voltage increase limits their application to a universal voltage range. The second stage is controlled as it is in the multi-stage approach.

The present topology is based on integrating a boost converter 210 operating in DCM with a ZAHB 220 in any form, for example a single winding or tapped inductor based ZAHB. The integration of the PFC and the ZAHB is done by sharing the same half bridge to perform PFC with a fixed duty cycle, which is also used by the second stage to control the output voltage.

The converter 200 comprises an ac generator 201 connected to a rectifier 202, a boost inductor $L_B$, a bulk capacitor $C_B$, and first and second primary switches $Q_1$ and $Q_2$. Converter 200 further comprises a transformer which may be modelled using leakage inductor $L_{lkg}$ and a magnetising inductance $L_m$, as well as a primary capacitor $C_{pri}$. The converter 200 further comprises, on the output side, a secondary winding of the transformer, a secondary capacitor $C_{sec}$, a output inductor and capacitor, $L_o$ and $C_o$ respectively, as well as a diode $D_1$ coupled in parallel across an output load. In the example of FIG. 2, the output load is n LEDs.

Such an approach may result in high ripple at the input, high total harmonic distortion, and therefore lack of control on bulk capacitor $C_B$, which therefore increases the requirements for $C_B$.

However, it is possible to implement a control in which a feedforward feedback is integrated to remove ripple at the output, and eliminate flicker, without penalizing the lifetime of the power supply by adding an electrolytic capacitor. A converter 300 is shown in FIG. 3, which incorporates a feedback control 310.

Figure 3:
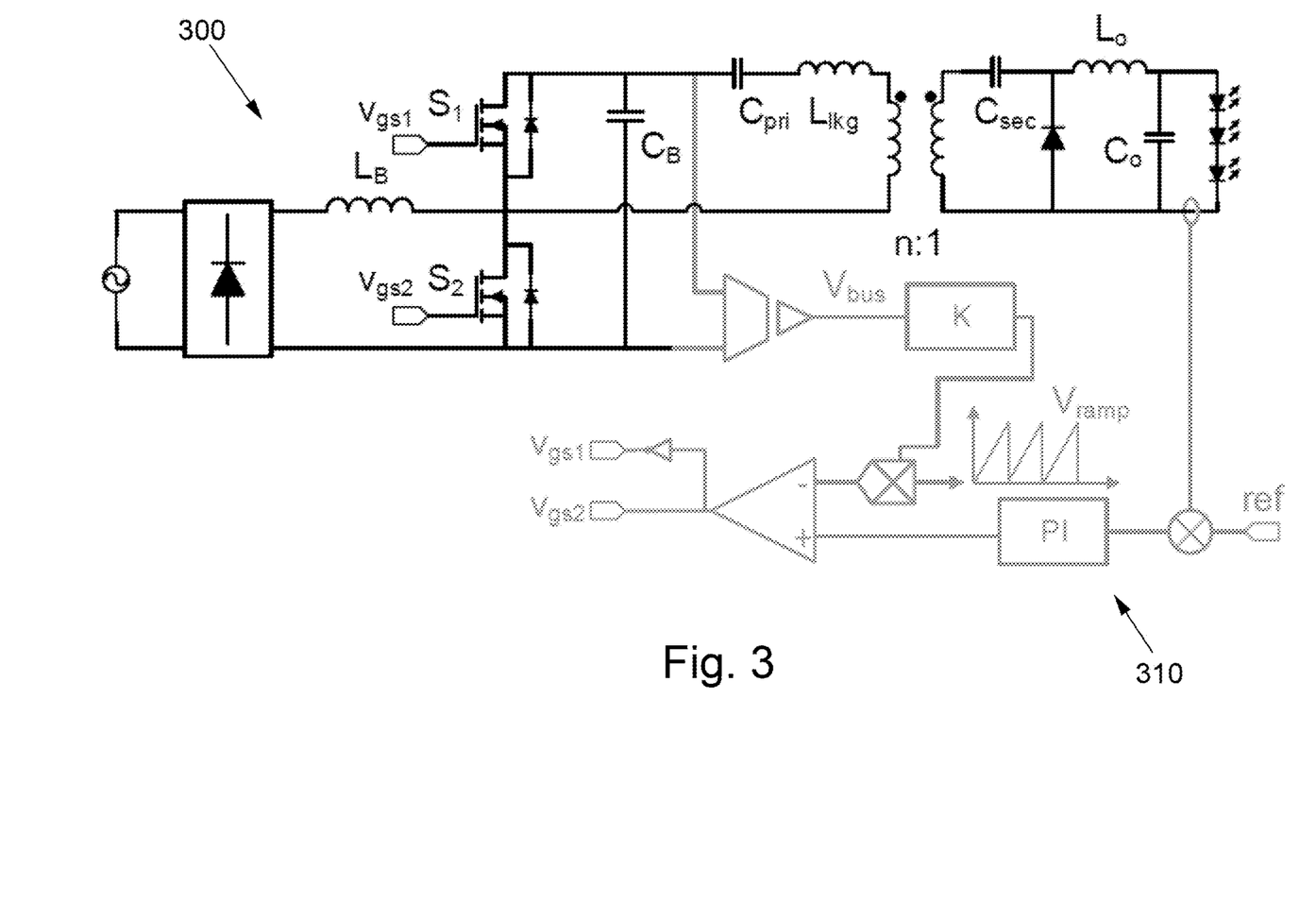
FIG. 3 an example circuit diagram of an integrated single-stage converter with an output feedback loop.

By applying a control loop as seen in FIG. 3, it is possible to provide automatic cancellation of the low-frequency ripple at the output. This provides particular use with a ZAHB converter when used in LED lighting applications. The control transfer function of the ZAHB converter (duty cycle to output voltage or current) presents the typical resonance between the input capacitor and the magnetizing inductance of the transformer, which is normally located at very low frequencies.

As a result, the maximum attainable bandwidth of the feedback loop is not always high enough as to cancel the low-frequency ripple that is introduced by the integrated PFC. Due to the linearity in the dc static gain, it is possible to use a feedforward loop to cancel the effect of the low-frequency ripple, leaving the feedback loop in charge of just controlling the emitted light of the lamp. In this way, the feedback loop can be slow enough to assure stability just because in many situations, the regulation of the emitted light does not require very fast responses.

As can be seen in FIG. 3, the output of the converter is sampled by the feedback control loop 310 and compared with a reference signal to generate the error. The output of the converter is sampled by the feedback control loop 310 and summed with the reference signal and the resultant signal integrated by proportional integration (PI) controller to remove ripple at the output, and eliminate flicker. For example, $V_{bus}$ is sensed (i.e. the voltage across $C_B$), and applied a gain, K, resulting in a measurement of $V_{ramp}$. $V_{ramp}$ is then subtracted from the integrated signal, to provide a driving voltage for the switches. The driving voltage is directly applied to one of the switches $S_1$ and $S_2$, with the signal being inverted for driving the other switch. In this way, the primary switches $S_1$ and $S_2$ are complimentarily driven, meaning that one of the switches is always turned on (neglecting the dead times needed for achieving zero voltage switching).

The feedforward allows for a certain variation of duty cycle to compensate for harmonics, but if it is controlled within a certain margin it can also introduce a very similar duty cycle variation that can help on the compliance with the DO-160G (this is typically for aviation) or any other harmonic regulation (for example, IEC-61000-3-2 Class C which is a typical one for LED in household applications). It is desirable to minimize the capacitor size with the feedforward, whilst maintaining compliance with the appropriate harmonic regulation, as such the variations of duty cannot be too large.

In summary, the variation in the dc link is leveraged in such way that the ripple is minimized and the harmonic content in the input current complies with the harmonic regulation. Advantageously, this also leads to a lower capacitor requirement in comparison with the traditional approach.

The present topology may be implemented as seen in the example converter 400 for providing power from generator 401 to LED array 402 as shown in FIGS. 4 to 9.

The converter has 5 operating modes operating in a cycle, as seen in FIGS. 5 to 9, which are illustrated at different times $t_0$ to $t_5$, and are described in full herein, with additional reference to the duty cycle of the feedback loop 310 as seen in FIG. 3 being used to drive $S_2$. Also in FIGS. 5 to 9 therein are various currents and voltages that are experienced during the control of the converter, which are then specifically related to the exact topology of the converter during that time period.

$V_{GS1}$ and $V_{GS2}$ relate to the gate source voltage of switches $S_1$ and $S_2$ respectively, as provided by feedback circuit 310. $i_{Llk}$ shows the current across the leakage inductor $L_{lkg}$, $i_{Lb}$ shows the current across boost inductor $L_B$, and $i_{D1}$ shows the current across diode $D_1$. Finally $V_{DS1}$ and $V_{DS2}$ relate to drain source voltage across switches $S_1$ and $S_2$ respectively. $L_m$ is the magnetising inductance in the transformer.

Figure 5:
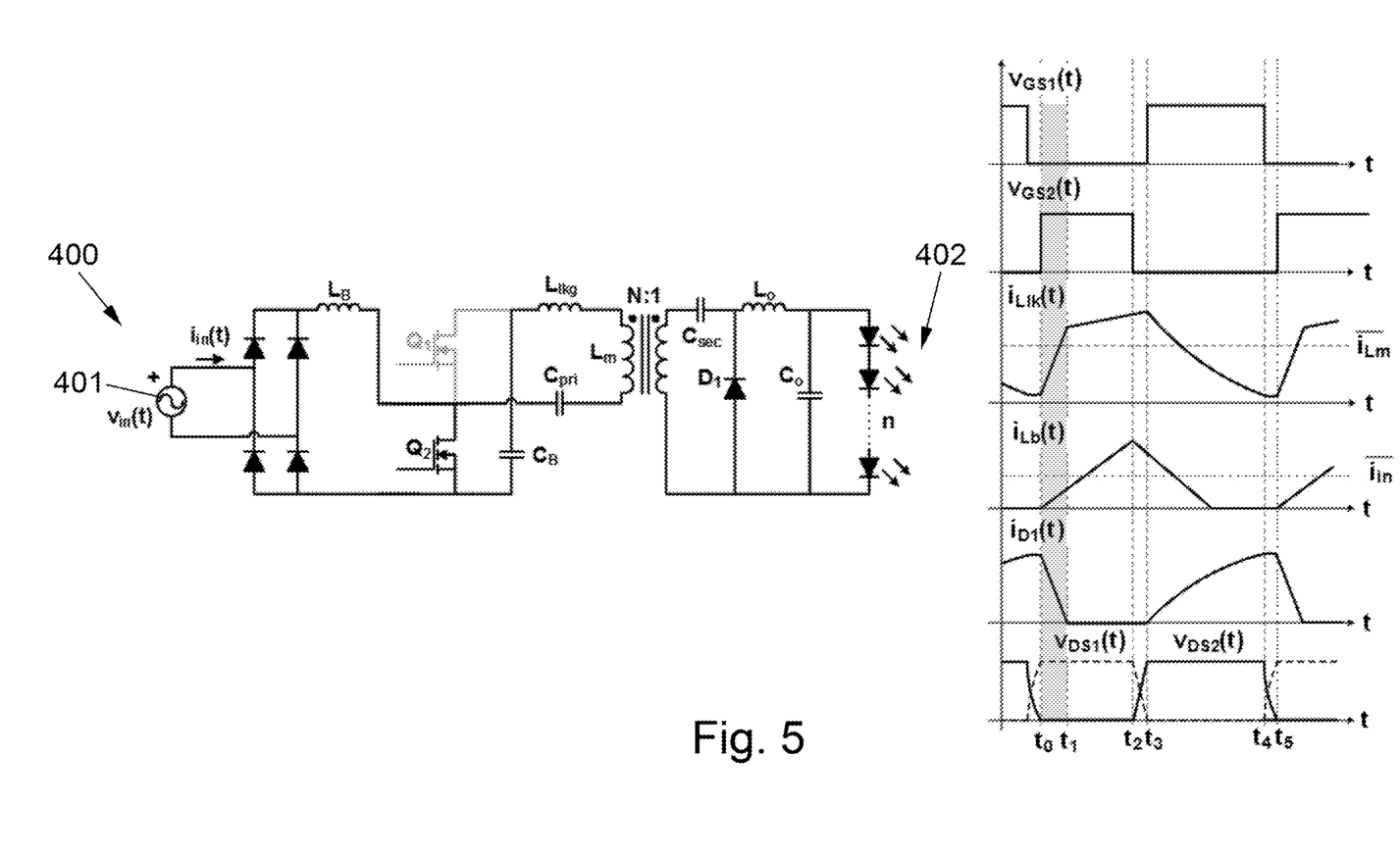
FIG. 5 is a view of the topology of the converter of FIG. 4 during a first operating mode ($t_0$ to $t_1$).

Operating mode 1 ($t_0$ to $t_1$) begins when $S_1$ is switched off and finishes when the current on $D_1$ reaches zero, as shown in FIG. 5. The power is transferred through leakage inductor $L_{lkg}$. This results in a steady increase of the current across inductor $L_B$, and a rapid increase in the current across inductor $L_{lkg}$. In this way, $L_B$ is magnetized at the input voltage, and $C_B$ is connected to the leakage inductor $L_{lkg}$. As a result, the leakage inductor $L_{lkg}$ is charged very rapidly, mainly because $D_1$ is conducting, and because $D_1$ is conducting, $L_o$ is discharged towards the LEDs.

Figure 6:
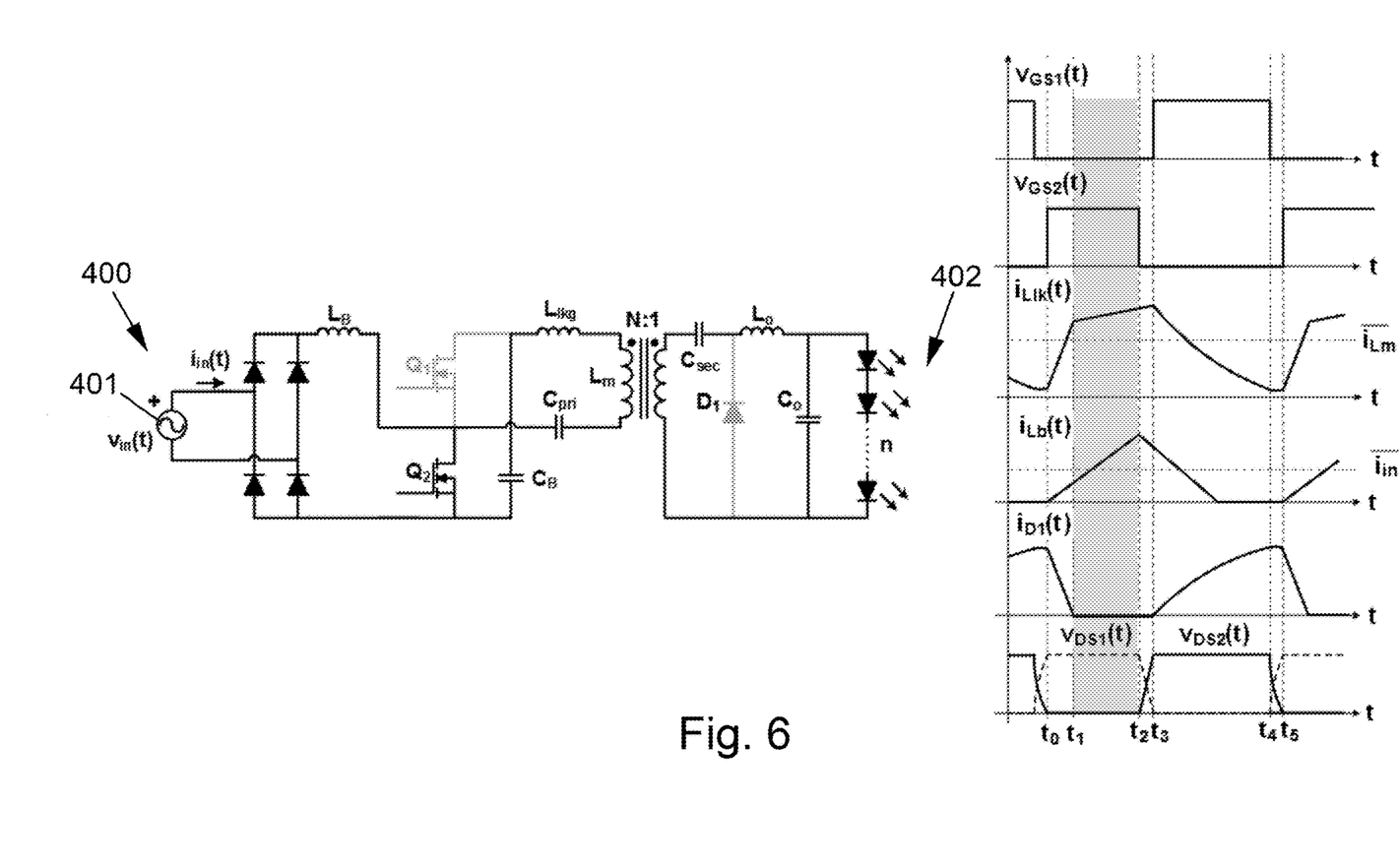
FIG. 6 is a view of the topology of the converter of FIG. 4 during a second operating mode ($t_1$ to $t_2$).

Operating mode 2 ($t_1$ to $t_2$) begins when diode $D_1$ is turned off. The power is transferred to the output through the secondary capacitor, $C_{sec}$ as seen in FIG. 6. This mode finishes when $S_2$ is turned off. During operation, from the perspective of $L_B$, the current keeps being magnetized. On the load side, $D_1$ has stopped conducting, and so $C_B$ does not give power to the load, and $L_o$ should magnetize. However, as operating mode 1 is very fast, it can be seen that mode 2 operates as an effective duty cycle. In this way, the transformer operates almost as a buck converter.

Figure 7:
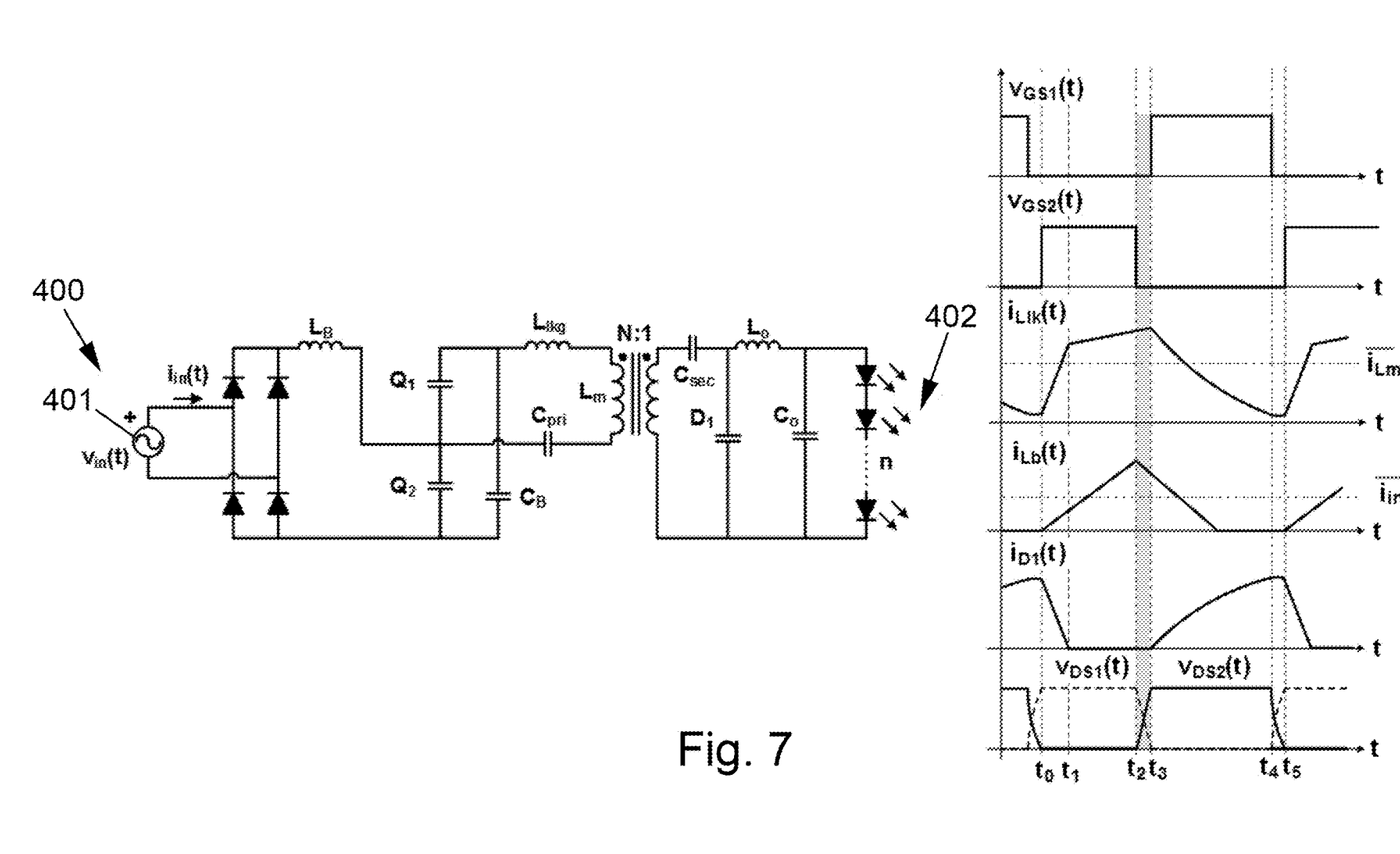
FIG. 7 is a view of the topology of the converter of FIG. 4 during a third operating mode ($t_2$ to $t_3$).

During operating mode 3 ($t_2$ to $t_3$), as is seen in FIG. 7, is a dead time, and begins when $S_2$ is turned off. In this way, a dead period is provided to ensure soft-switching, as there are resonances to take into account. At time $t_2$, $S_2$ is turned off, and $L_{lkg}$ and the capacitances associated with $S_1$ and $S_2$ begin to resonate. The energy stored in $L_{lkg}$ charges $S_2$ and discharges $S_1$.

Figure 8:
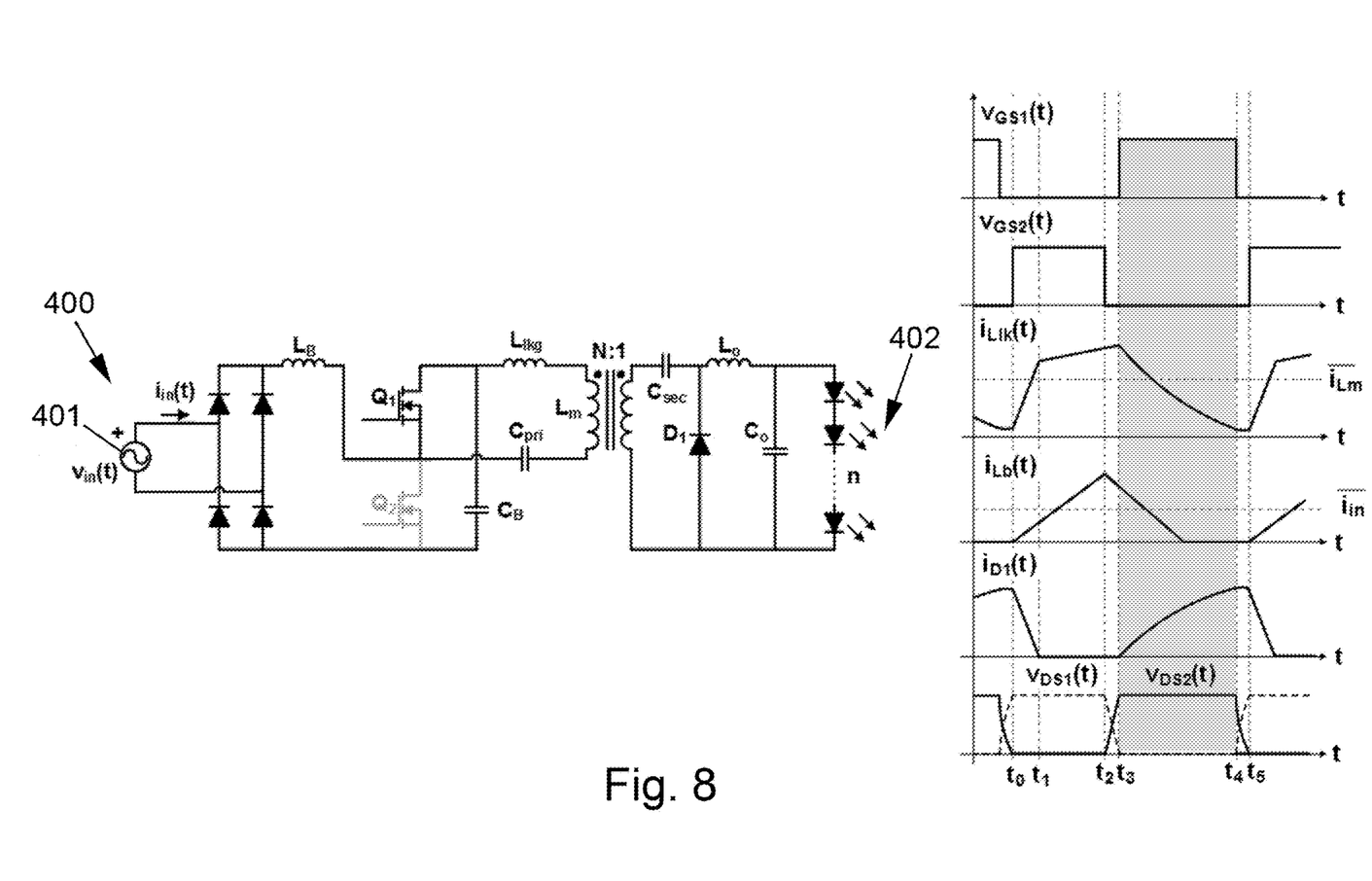
FIG. 8 is a view of the topology of the converter of FIG. 4 during a fourth operating mode ($t_3$ to $t_4$).
Figure 9:
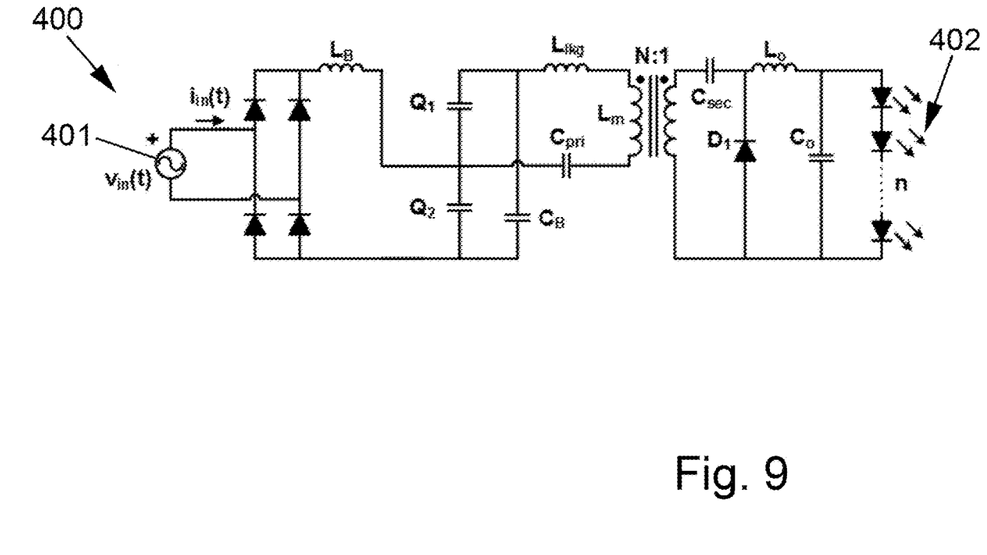
FIG. 9 is a view of the topology of the converter of FIG. 4 during a fifth operating mode ($t_4$ to $t_5$).

During operating mode 4 ($t_3$ to $t_4$), as is seen in FIG. 8. In this mode, $S_1$ shorts the transformer and the primary capacitor, $C_{pri}$, which causes the resonance of $L_{lkg}$ and the conduction of $D_1$, forcing $L_o$ to demagnetize through the LEDs. From the perspective of the input, the current is demagnetized into $C_B$ until the current reaches zero. The current cannot go below zero because of the input diode bridge. This is fundamental to ensure DCM operation.

During operating mode 5 ($t_4$ to $t_5$), as is seen in FIG. 9 again is a dead time, similar to that of mode 3, as seen in FIG. 7. At time $t_4$, $S_1$ is turned off, and mode 5 begins. Charge stored in the inherent capacitance of $S_2$ is discharged, charging $Q_1$. Therefore, $v_{DS2}$ is linearly decreased, and $v_{DS1}$ is increased.

Figure 4:
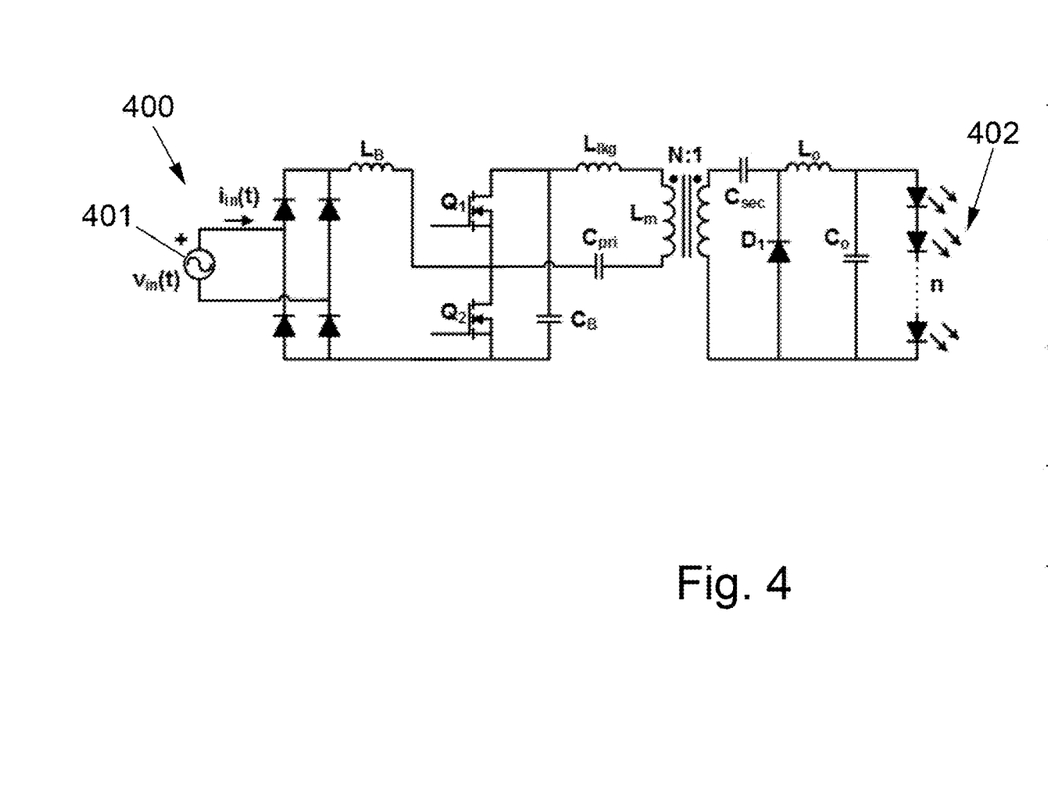
FIG. 4 shows an example converter topology.

By utilising such operating modes, it is possible to provide soft-switching on the main switches, in terms of zero voltage switching and zero current switching (ZCS), which makes the converter suitable for very fast switching operation and integration. Control of the converter 400 is configured such that soft-switching occurs during the dead times, due to the discharge of $Q_1$ across $S_1$, $C_{oss1}$, as demanded by the transformer. In the case of $Q_2$, $C_{oss2}$ resonates with $L_{lkg}$ steadily discharging. The operation of the boost in DCM ensures ZCS on $Q_2$.

The topology can be controlled by way of small variations of the duty cycle. The dead times, the leakage inductance $L_{lkg}$ and $C_{oss}$ need to be selected adequately to achieve soft-switching. For example, in order to achieve ZVS at turn-on for $Q_1$, or $Q_2$, there must be sufficient energy stored in resonant inductor, $L_{lkg}$, to completely discharge the resonant capacitor $C_r$. It should be noted that the resonant capacitance $C_r$, is the lumped capacitance of junction capacitance ($C_{oss}$) of both switches $S_1$, and $S_2$, along with the intrawinding capacitance ($C_{TR}$) of the transformer. Ideally, a slightly larger leakage inductor may be selected, so as to ensure soft-switching. In the present case, as yin is changing at the grid frequency, $L_{lkg}$ should be selected at the worst point of operation, to ensure soft switching at all points.

In addition, the application of feedforward feedback serves two main purposes in the proposed topology. Firstly, ripple in the output voltage is diminished.

Figure 10:
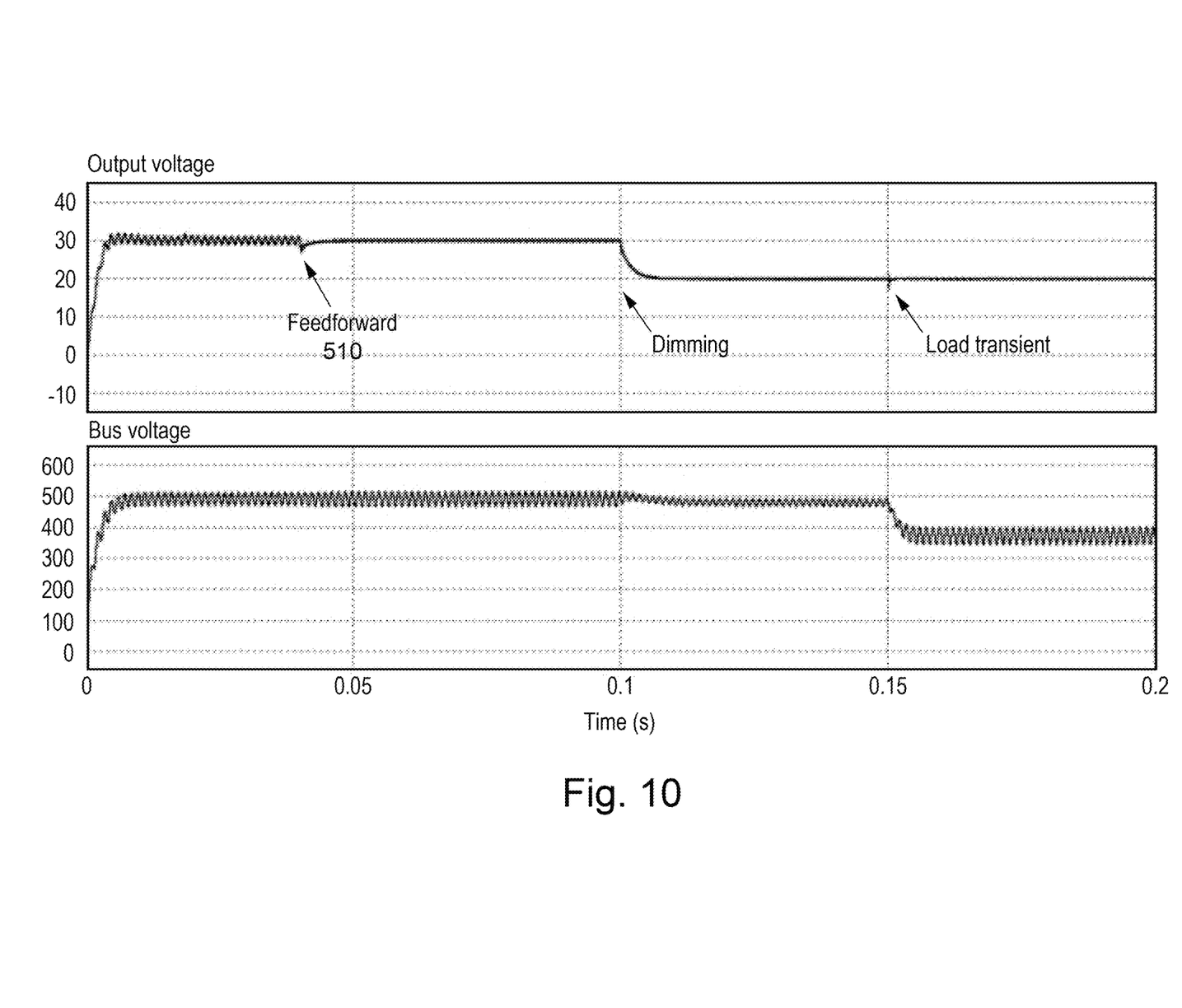
FIG. 10 shows a simulation of a converter showing output and bus voltage under closed loop operation under different effects: feedforward, dimming and a load transient.

FIG. 10 shows a simulation of the proposed converter, which shows both output and bus voltage under closed loop operation under different effects: feedforward, dimming and a load transient. As can be seen in FIG. 10 at point 510 when the feedforward feedback it is triggered after 40 ms, the application of feedforward feedback greatly diminishes the ripple in the output voltage.

Secondly, the switching makes the duty cycle vary, which leads to a significant improvement to the harmonic distortion. This improvement in harmonic distortion helps to diminish the bus voltage that may otherwise be too high for a boost converter working in DCM in order to comply with the harmonic regulation requirements.

Figure 11:
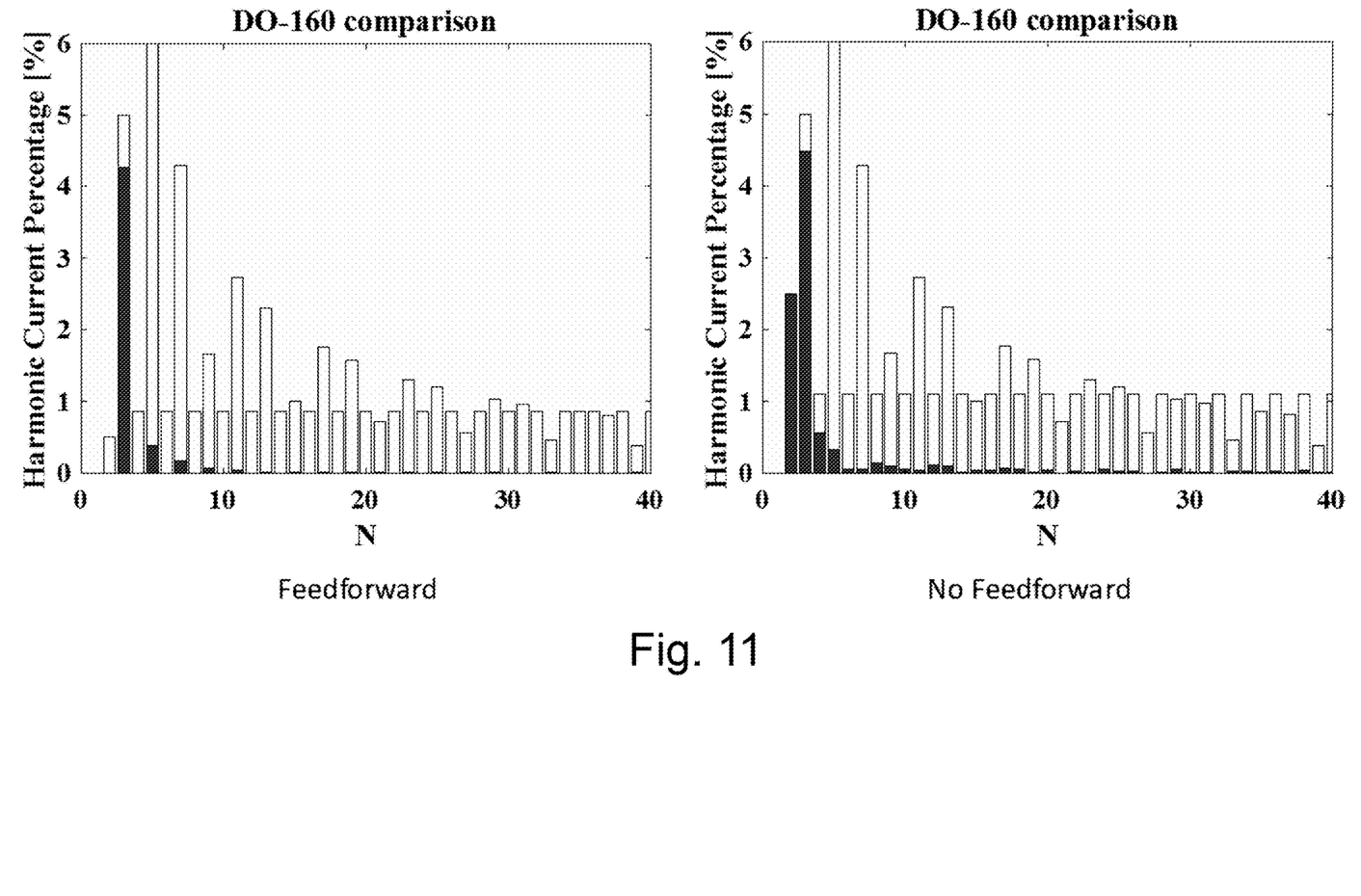
FIG. 11 shows the harmonic content of the input current to a converter with feedforward (a) and without feedforward (b).

FIG. 11 shows a comparison between the harmonic content of the input current (a) with feedforward and (b) without feedforward. This can be seen in FIG. 11, wherein it is shown how the variations introduced by the duty cycle impact the 2nd and 4th harmonic. This helps to comply with harmonic regulation, when compared to the case without feedforward.

Whilst it is envisaged that the integrated stages as described above will find particular use in LED driving for powers up to 200 W due to the specific characteristics of an LED load, other uses are also envisaged.

As touched upon above, the proposed converter provides several advantages. The integration of the PFC and the ZAHB results in a topology that is compact and presents a low component count. As described above, it is possible to achieve soft-switching operation having very reduced switching losses, which makes it ideal for high frequency operation. By utilising feedforward control, it is possible to achieve the aforementioned benefits whist reducing the capacitive requirements and reduces the harmonic content.

In addition, when used as a driver for LEDs, consistent light quality can be ensured without using electrolytic capacitors, translating into a long lifetime for the proposed driver, for example around 100,000 hours. Additionally, the specific power even at high operating frequencies are expected to be at least five times higher than for current known topologies. The efficiency of the converter may be around 95% reducing weight and energy waste. Finally, the proposed topology has galvanic isolation and can be based either on a tapped inductor or a single winding ZAHB. In addition, when the converter is based on a boost converter, it would be simple to add an extra winding to supply all the required auxiliary circuitry.

The invention claimed is:

1. An integrated single stage ac-dc driver for powering LED loads comprising
    a boost converter operating in a Discontinuous Conduction Mode, DCM, comprising a half-bridge;
    a Zeta Asymmetrical Half Bridge, ZAHB, integrated with the boost converter such that the boost converter and the ZAHB share the half-bridge to perform power factor control, PFC, with a fixed duty cycle and control an output voltage.

2. The integrated single stage ac-dc driver of claim 1 further comprising a feedforward-feedback loop configured to provide proportional integral feedback control to remove ripple and eliminate flicker at the output voltage.

3. The integrated single stage ac-dc driver of claim 1, further comprising a resonant inductor, $L_{lkg}$, configured to completely discharge a first and a second primary switch of the half-bridge to enable zero voltage switching of the primary switches.

4. The integrated single stage ac-dc driver of claim 1, wherein the ZAHB is a single winding ZAHB.

5. An electrical distribution system comprising:
    an ac generator;
    at least one dc load; and
    the integrated single stage ac-dc driver of claim 1;
    wherein the integrated single stage ac-dc driver is configured to convert ac power from the ac power generator to dc power to power the at least one dc load with the output voltage.

6. The electrical distribution system of claim 5, wherein the at least one dc load comprise at least one LED load.

7. The electrical distribution system of claim 5, wherein the electrical distribution system is an electrical distribution system for an aircraft.

8. The electrical distribution system of claim 5, wherein the electrical distribution system is an electrical distribution system for households.

9. A method, the method comprising
operating a boost converter in a Discontinuous Conduction Mode, DCM, the boost converter comprising a half-bridge;
integrating a Zeta Asymmetrical Half Bridge, ZAHB, with the boost converter such that the boost converter and the ZAHB share the half-bridge to perform power factor control, PFC, with a fixed duty cycle and control of an output voltage.

10. The method of claim 9, further comprising
providing a feedforward-feedback loop to provide proportional integral feedback control to remove ripple and eliminate flicker at the output voltage.

11. The method of claim 10, further comprising
converting ac power from an ac power generator to dc power; and
providing the converted dc power to at least one dc load.

12. The method of claim 11, wherein the at least one dc load comprises at least one LED load.

13. The method of claim 11, wherein the at least one DC load is a load within an aircraft.

14. The method of claim 9, further comprising
providing a resonant inductor, $L_{lkg}$, configured to completely discharge a first, $S_1$, and a second, $S_2$, primary switch of the half-bridge to enable zero voltage switching of the primary switches.

* * * * *